(12) United States Patent
Ouderkirk et al.

(10) Patent No.: US 11,662,510 B2
(45) Date of Patent: May 30, 2023

(54) OPTICALLY ANISOTROPIC POLYMER THIN FILMS

(71) Applicant: META PLATFORMS TECHNOLOGIES, LLC, Menlo Park, CA (US)

(72) Inventors: Andrew John Ouderkirk, Redmond, WA (US); Tanya Malhotra, Redmond, WA (US); Sheng Ye, Redmond, WA (US); Liliana Ruiz Diaz, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 665 days.

(21) Appl. No.: 16/736,186

(22) Filed: Jan. 7, 2020

(65) Prior Publication Data

US 2021/0208319 A1   Jul. 8, 2021

(51) Int. Cl.
    *G02B 5/30* (2006.01)
    *B29C 55/02* (2006.01)
    *B29C 55/08* (2006.01)
    *B29C 55/20* (2006.01)

(52) U.S. Cl.
    CPC ............ *G02B 5/305* (2013.01); *B29C 55/023* (2013.01); *B29C 55/08* (2013.01); *B29C 55/20* (2013.01); *B29K 2995/0031* (2013.01); *B29K 2995/0044* (2013.01); *B29K 2995/0051* (2013.01); *B29K 2995/0097* (2013.01)

(58) Field of Classification Search
    CPC ....... G02B 5/305; B29C 55/023; B29C 55/08; B29C 55/20
    See application file for complete search history.

(56) References Cited

U.S. PATENT DOCUMENTS

| | | | |
|---|---|---|---|
| 9,069,136 B2 | 6/2015 | Weber et al. |
| 9,110,245 B2 | 8/2015 | Derks et al. |
| 9,477,011 B2 | 10/2016 | Liu et al. |
| 10,350,818 B2 | 7/2019 | Merrill et al. |
| 10,444,563 B2 | 10/2019 | Shimizu et al. |
| 2006/0226561 A1 | 10/2006 | Merrill et al. |
| 2006/0257515 A1 | 11/2006 | Merrill et al. |
| 2007/0047080 A1 | 3/2007 | Stover et al. |

(Continued)

OTHER PUBLICATIONS

International Search Report and Written Opinion received for PCT Application Serial No. PCT/US2020/063512 dated Apr. 16, 2021, 12 pages.

(Continued)

*Primary Examiner* — Mathieu D Vargot
(74) *Attorney, Agent, or Firm* — Greenberg Traurig, LLP

(57) ABSTRACT

A polymer layer includes a first in-plane refractive index extending along a first direction of the polymer layer, a second in-plane refractive index less than the first in-plane refractive index extending along a second direction of the polymer layer orthogonal to the first direction, a third refractive index along a direction orthogonal to both the first direction and the second direction, and a plurality of wrinkles extending along a surface of the polymer layer, where a difference between the first in-plane refractive index and the second in-plane refractive index is at least approximately 0.05, and the third refractive index is greater than the second in-plane refractive index.

8 Claims, 12 Drawing Sheets

(56) References Cited

U.S. PATENT DOCUMENTS

2011/0103036 A1    5/2011   Bosl et al.
2017/0183504 A1*   6/2017   Ueki .......................... C08J 7/16

OTHER PUBLICATIONS

International Preliminary Reporton Patentability for International Application No. PCT/US2020/063512, dated Jul. 21, 2022, 9 pages.
Invitation to Pay Additional Fees received for PCT Application Serial No. PCT/US2020/063512 dated Feb. 26, 2021, 9 pages.
Cakmak et al., "Structure Development in High-Speed Spinning of Polyethylene Naphthalate (PEN) Fibers", Journal of Applied Polymer Science, vol. 64, 1997, pp. 729-747.

* cited by examiner

OPTICALLY ANISOTROPIC POLYMER THIN FILMS

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
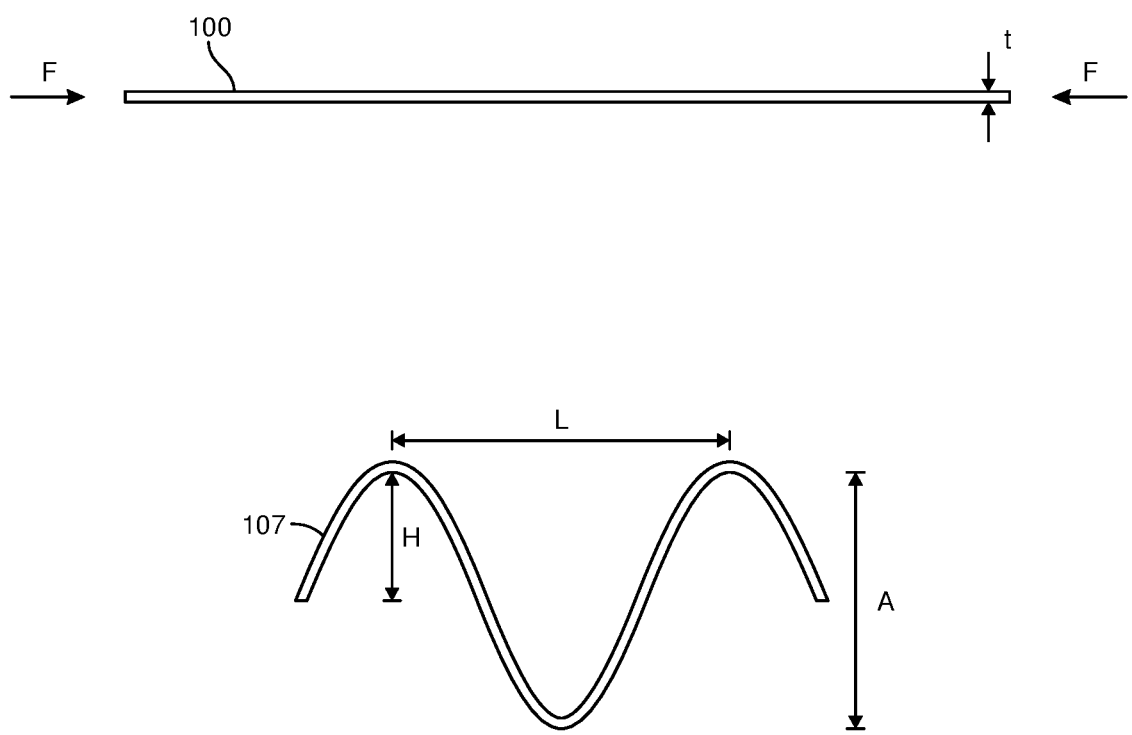
FIG. 1 is a cross-sectional schematic view showing the wrinkling of a polymer thin film according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Reflective polarizers are used in many display-related applications, particularly in pancake optical systems and for brightness enhancement within display systems that use polarized light. For orthogonally polarized light, for example, pancake lenses may use reflective polarizers with extremely high contrast ratios for transmitted light, reflected light, or both transmitted and reflected light. Highly birefringent thin films may also be used to form birefringent gratings. As such, there is a need for optical thin films having very high levels of optical anisotropy.

The degree of optical anisotropy achievable through conventional thin film manufacturing processes is typically limited, however, and is often exchanged for competing thin film properties such as flatness and/or film strength. For example, highly anisotropic polymer thin films often exhibit low strength in one or more in-plane directions, which may challenge manufacturability and limit throughput. Notwithstanding recent developments, it would be advantageous to provide mechanically robust, optically anisotropic polymer thin films that may be incorporated into various optical systems including display systems for artificial reality applications.

The instant disclosure is directed generally to optically anisotropic polymer thin films and their methods of manufacture, and more specifically to the stress-induced buckling of polymer thin films and the attendant realization of directionally-dependent refractive indices therein. In some embodiments, the presently-disclosed optically anisotropic polymer thin films may form, or be incorporated into, an optical element such as a reflective polarizer. Example reflective polarizers may be used in various display devices, such as virtual reality (VR) and augmented reality (AR) glasses and headsets.

In accordance with various embodiments, a reflective polarizer may include a multilayer architecture of alternating (i.e., primary and secondary) polymer layers. In certain aspects, the primary and secondary polymer layers may be configured to have (a) refractive indices along a first in-plane direction (e.g., x-direction) that differ sufficiently to substantially reflect light of a first polarization state, and (b) refractive indices along a second in-plane direction (e.g., y-direction) orthogonal to the first in-plane direction that are matched sufficiently to substantially transmit light of a second polarization state. That is, a reflective polarizer may reflect light of a first polarization state and transmit light of a second polarization state orthogonal to the first polarization state. As used herein, "orthogonal" states may, in some examples, refer to complementary states that may or may not be related by a 90° geometry. For instance, "orthogonal" directions used to describe the length, width, and thickness dimensions of a polymer thin film may or may not be precisely orthogonal as a result of non-uniformities in the thin film.

One or more of the polymer layers, i.e., one or more primary polymer layers and/or one or more secondary polymer layers, may be characterized by a directionally-dependent refractive index. By way of example, a primary polymer layer (or a secondary polymer layer) may have a first in-plane refractive index, a second in-plane refractive index orthogonal to and less than the first in-plane refractive index, and a third refractive index along a direction orthogonal to a major surface of the primary (or secondary) polymer layer (i.e., orthogonal to both the first in-plane refractive index and the second in-plane refractive index), where a difference between the first in-plane refractive index and the second in-plane refractive index is at least approximately 0.05, and the third refractive index is greater than the second in-plane refractive index. An optically anisotropic polymer thin film may have in-plane refractive indices that differ by at least approximately 0.05, e.g., 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, or 1, including ranges between any of the foregoing values.

According to some embodiments, the areal dimensions (i.e., length and width) of an optically anisotropic polymer thin film may independently range from approximately 5 cm to approximately 50 cm or more, e.g., 5, 10, 20, 30, 40, or 50 cm, including ranges between any of the foregoing values. Example optically anisotropic polymer thin films may have areal dimensions of approximately 5 cm×5 cm, 10 cm×10 cm, 20 cm×20 cm, 50 cm×50 cm, 5 cm×10 cm, 10 cm×20 cm, 10 cm×50 cm, etc.

In a multilayer architecture of alternating polymer layers, each primary polymer layer and each secondary polymer layer may independently have a thickness ranging from approximately 10 nm to approximately 200 nm, e.g., 10, 20, 50, 100, 150, or 200 nm, including ranges between any of the foregoing values. A total multilayer stack thickness may range from approximately 1 micrometer to approximately 10 micrometers, e.g., 1, 2, 5, or 10 micrometers, including ranges between any of the foregoing values.

In some embodiments, a multilayer structure may be characterized by a progressive change in the thickness of each primary and secondary polymer layer pair. That is, a multilayer architecture may be characterized by an internal thickness gradient where the thickness of individual primary and secondary polymer layers within each successive pair changes continuously throughout the stack.

In various aspects, by way of example, a multilayer stack may include a first pair of primary and secondary polymer layers each having a first thickness, a second pair of primary and secondary polymer layers adjacent to the first pair each having a second thickness that is less than the first thickness, a third pair of primary and secondary polymer layers adjacent to the second pair each having a third thickness that is less than the second thickness, etc. According to certain embodiments, a thickness step for such a multilayer stack may be approximately 2 nm to approximately 20 nm, e.g., 2, 5, 10, or 20 nm, including ranges between any of the foregoing values. By way of example, a multilayer stack having a thickness gradient with a 10 nm thickness step may include a first pair of primary and secondary polymer layers each having a thickness of approximately 85 nm, a second pair of primary and secondary polymer layers adjacent to the first pair each having a thickness of approximately 75 nm, a third pair of primary and secondary polymer layers adjacent to the second pair each having a thickness of approximately 65 nm, and a fourth pair of primary and secondary polymer layers adjacent to the third pair each having a thickness of approximately 55 nm, and so on.

Although not particularly limited, example polymer materials are capable of developing birefringence, and may include polyethylene naphthalate (PEN) (i.e., poly(ethylene) 2,6-naphthalate), polyethylene terephthalate (PET), polyethylene isophthalate (PEI), as well as combinations, including co-polymers thereof. As used herein, the terms "polymer thin film" and "polymer layer" may be used interchangeably.

In certain embodiments, a multilayer structure may include a stack of alternating primary polymer layers and secondary polymer layers where the primary polymer layers may exhibit a higher degree of in-plane optical anisotropy than the secondary polymer layers. For instance, the primary polymer layers may have in-plane refractive indices that differ by at least 0.2 whereas the secondary polymer layers may have in-plane refractive indices that differ by less than 0.2. In such embodiments, the primary (more optically anisotropic) polymer layers may include polyethylene naphthalate, polyethylene terephthalate, or polyethylene isophthalate, and the secondary (less optically anisotropic) polymer layers may include a co-polymer of any two of the foregoing, e.g., a PEN-PET co-polymer.

A polymer layer or polymer multilayer may be tensioned along at least one in-plane direction (e.g., tensioned uniaxially) to induce directionally-dependent indices of refraction and the concomitant formation of buckling throughout the layer(s). Such an example layer or multilayer, after tensioning, may include a first in-plane refractive index extending along a first direction of the polymer layer(s), a second in-plane refractive index less than the first in-plane refractive index extending along a second direction of the polymer layer(s) orthogonal to the first direction, a third refractive index along a direction orthogonal to both the first direction and the second direction, and a plurality of wrinkles extending along a surface of the polymer layer(s), where a difference between the first in-plane refractive index and the second in-plane refractive index is at least approximately 0.05, and the third refractive index is greater than the second in-plane refractive index.

An optically anisotropic polymer thin film may be formed using a thin film orientation system configured to stretch a polymer thin film in one in-plane direction. For instance, a thin film orientation system may be configured to stretch a polymer thin film along one in-plane direction (e.g., the x-direction) while constraining the thin film in an orthogonal in-plane direction (e.g., the y-direction).

According to some embodiments, a polymer thin film may be stretched along a direction parallel to a direction of film travel through a thin film orientation system. By way of example, a polymer thin film that is initially rolled onto a source roller may be fed from the source roller at a first speed, heated, and collected at an uptake roller operating at a second speed greater than the first speed such that the heated polymer thin film is stretched along its length between the source roller and the uptake roller.

According to further embodiments, a polymer thin film may be stretched transversely to a direction of film travel through a thin film orientation system. In such embodiments, a polymer thin film may be held along opposing edges by a clamping mechanism that is connected to a diverging track system such that the polymer thin film is stretched in a transverse direction (TD) as it moves along a machine direction (MD) through a deformation zone of the thin film orientation system. The transverse tension may induce in-plane compression in the machine direction, which may cause buckling of the polymer thin film and the formation of wrinkles.

Wrinkles may extend randomly or periodically across a surface of a polymer thin film and may be aligned with the machine direction or another direction. In some embodiments, a length of the wrinkles may be substantially parallel to the machine direction. In some embodiments, a length of the wrinkles may be substantially orthogonal to the machine direction. The wrinkles may either be self-formed or induced. Self-formed wrinkles may, for example, be a result of the polymer thin film being in a state of compression in the film plane along the direction perpendicular to the stretch axis. Alternatively, the wrinkles may be induced by applying appropriate forces out of the plane of the film. For example, a single or opposing cog-shaped wheel may be used to initiate, or even fully form, the wrinkles.

The optically anisotropic polymer thin films disclosed herein may be used to form multilayer reflective polarizers that may be implemented in a variety of applications. For instance, a multilayer reflective polarizer may be used to increase the polarized light output by an LED- or OLED-based display grid that includes an emitting array of monochromatic, colored, or IR pixels. In some embodiments, a reflective polarizer thin film may be applied to an emissive pixel array to provide light recycling and increased output for one or more polarization states. Moreover, highly optically anisotropic polymer thin films may decrease pixel blur in such applications.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-12, detailed descriptions of methods and systems for manufacturing optically anisotropic polymer thin films. The discussion associated with FIG. 1 includes a description of the structure of an example wrinkled polymer thin film. The discussion associated with FIGS. 2-6 includes a description of systems for forming wrinkled polymer thin films having a refractive index anisotropy. The discussion associated with FIG. 7 includes a description of an example multilayer polymer stack forming a reflective polarizer. The discussion associated with FIGS. 8-10 includes a description of the reflectance behavior of various multilayer polymer stacks. The discussion associated with FIGS. 11 and 12 relates to exemplary virtual reality and augmented reality devices that may include one or more optically anisotropic polymer thin films as disclosed herein.

In accordance with various embodiments, referring to FIG. 1, a compressive mechanical force (F) may produce a modification of the surface structure of a polymer thin film 100 having an initial thickness (t), where different morphologies with particular geometries and shapes can be obtained. For instance, a wavy structure, i.e., "wrinkles" may be generated having a wrinkle height (H), a wrinkle amplitude (A), and a wrinkle periodicity (L) as illustrated in conjunction with example wrinkled polymer thin film 107.

Figure 2:
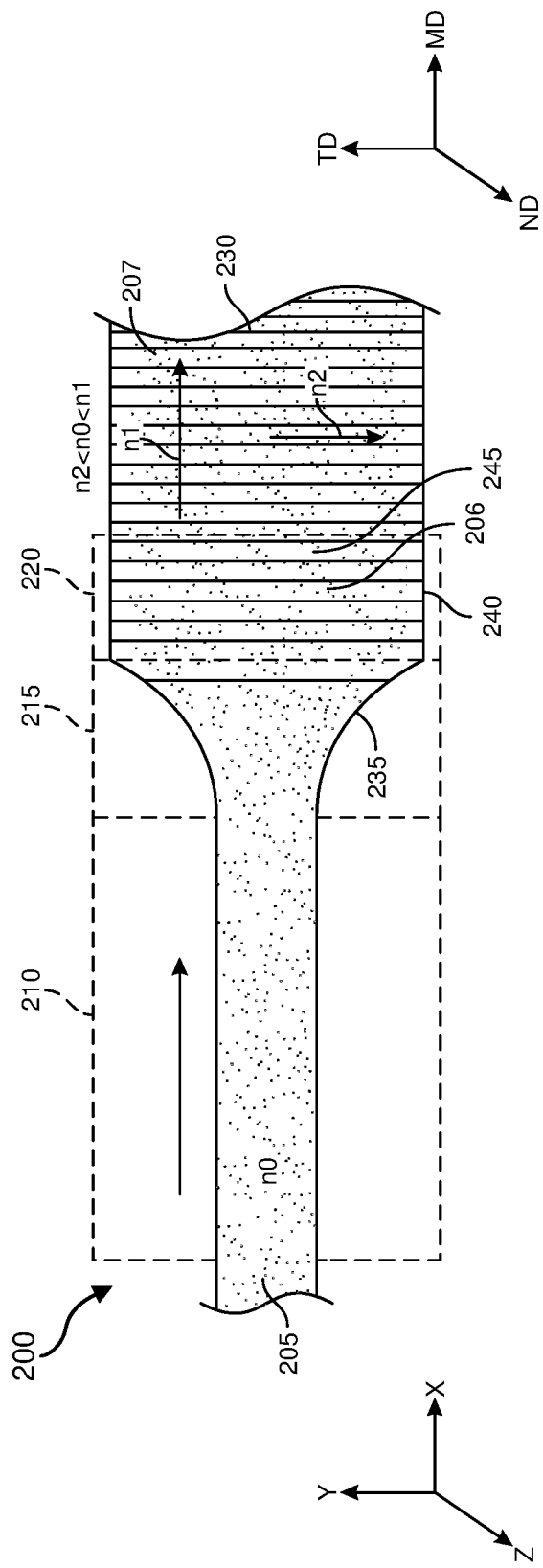
FIG. 2 is a schematic top down plan view illustration of an example thin film orientation system according to some embodiments.

Referring to FIG. 2, shown schematically is a thin film orientation system for manufacturing an optically anisotropic polymer thin film. During operation of system 200, a polymer thin film 205 having an initial bulk refractive index (n0) may be guided along a machine direction (MD) into pre-heating zone 210 wherein the polymer thin film 205 may be pre-heated to a desired temperature. A pre-heating temperature may range from approximately 80° C. to approximately 200° C., for example.

In conjunction with various embodiments, a polymer thin film (e.g., heated polymer thin film 205) may be described with reference to three mutually orthogonal axes that are aligned with the machine direction (MD), the transverse direction (TD), and the normal direction (ND), which may correspond respectively to the length, width, and thickness of the polymer thin film.

After passing through pre-heating zone 210, the heated polymer thin film 205 may be subjected to a uniaxial stress and accordingly stretched in one direction, e.g., a transverse direction (TD), which in the illustrated embodiment may be orthogonal to the machine direction. According to some embodiments, the stretching operation may be performed by guiding the edges of the heated polymer thin film 205 along guide path 235 such as by clamping the edges of the polymer thin film to conveyors (not shown) that traverse the guide path 235. Guide path 235 may have a shape such that the heated polymer thin film 205 is in compression during at least a portion of the stretching operation. For instance, the translation velocity in the machine direction of the polymer thin film 205 within deformation zone 215 may be less than the translation velocity in pre-heating zone 210 such that the polymer thin film 205 may be in compression in the machine direction, e.g., along the full guide path 235 or along one or more portions of the guide path 235 within deformation zone 215.

Furthermore, the temperature of the polymer thin film 205 may be maintained at a desired temperature before and/or during the act of stretching, i.e., within deformation zone 215, in order to improve the deformability of the polymer thin film relative to an un-heated polymer thin film. The temperature of the polymer thin film 205 within deformation zone 215 may be less than, equal to, or greater than the temperature of the polymer thin film within pre-heating zone 210.

As will be appreciated, transverse tension and compression along the machine direction may induce buckling, i.e., the formation of wrinkles 245, in polymer thin film 205. In example embodiments, wrinkles 245 may be substantially parallel and may extend along the transverse direction of the polymer thin film 205. Accordingly, as shown in FIG. 2, a plurality of wrinkles 245 may extend in a width direction from one edge to an opposite edge of the polymer thin film 205.

The mechanism of wrinkle formation may be described as a competition between stretching and bending. When an elastic thin film material is stressed, the surface may remain flat until a critical strain for buckling is reached and wrinkles are formed via periodic bending of the thin film. Wrinkled or buckled surfaces may be characterized by their wrinkle morphology, which may include an average height (H) and periodicity (L) of the wrinkles. In certain embodiments, wrinkle morphology may be uniform or non-uniform. That is, a wrinkled surface may include homogeneous wrinkling with substantially constant wrinkle height and/or periodicity or non-homogeneous wrinkling with varying wrinkle height and/or periodicity.

Moreover, the transverse tension and accompanying compression along the machine direction may, relative to the initial bulk refractive index (n0), decrease the refractive index of the wrinkled polymer thin film 206 along the transverse direction and increase the refractive index of the wrinkled polymer thin film 206 along the machine direction such that $n2<n0<n1$, where n1 is the refractive index of the wrinkled polymer thin film 206 along the machine direction and n2 is the refractive index of the wrinkled polymer thin film 206 along the transverse direction orthogonal to the machine direction.

After stretching, the wrinkled polymer thin film 206 may be disconnected from the conveyors (not shown). In some embodiments, the conveyors may release the wrinkled polymer thin film 206. In some embodiments, the wrinkled polymer thin film 206 may be cut to form a cut edge 240 and accordingly separate the wrinkled polymer thin film 206 from the conveyors. The wrinkled polymer thin film 206 may be cooled in cooling region 220 and may exit system 200 at exit 230 as a wrinkled and optically anisotropic polymer thin film 207.

Figure 3:
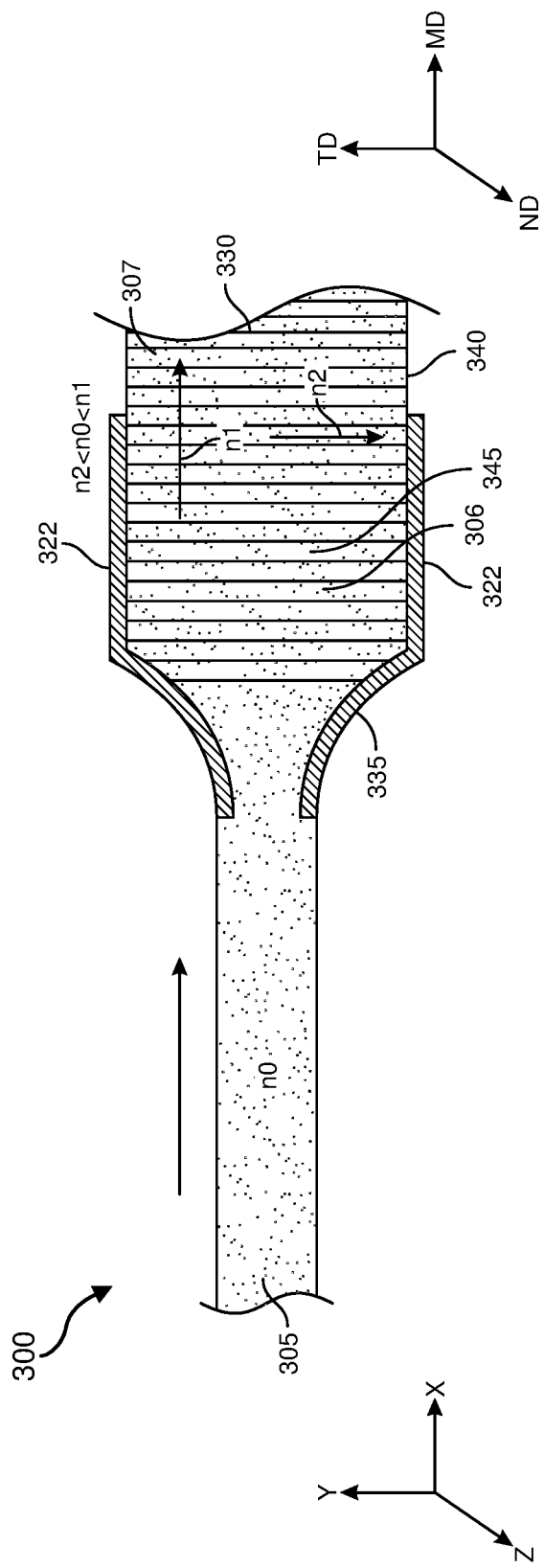
FIG. 3 is a schematic view of a polymer thin film transported by conveyors through an example thin film orientation system according to some embodiments.

Referring to FIG. 3, shown is a further thin film orientation system for manufacturing an optically anisotropic polymer thin film. As illustrated, a polymer thin film 305 having an initial bulk refractive index (n0) may be guided along a machine direction (MD) of system 300.

As in the previous embodiment, the polymer thin film 305 may be subjected to a uniaxial stress and accordingly stretched in one direction, e.g., a transverse direction (TD) that is orthogonal to the machine direction. The stretching operation may be performed by guiding the edges of the polymer thin film 305 along guide path 335 such as by clipping the edges of the polymer thin film to conveyors 322 that follow guide path 335. For instance, conveyors 322 may include opposing belts that clamp the top and bottom surfaces of the polymer thin film 305. Guide path 335 may have a shape such that the polymer thin film 305 is in compression during at least a portion of the stretching operation. For instance, the polymer thin film 305 may be in compression in the machine direction along the full guide path 335 or along one or more portions of the guide path 335. In some embodiments, the polymer thin film 305 may be heated and maintained at a desired temperature before and/or during the act of stretching.

The transverse tension and compression along the machine direction may induce buckling, i.e., the formation of wrinkles 345, in polymer thin film 305. In example embodiments, wrinkles 345 may be substantially parallel and extend along the transverse direction of wrinkled polymer thin film 306. Accordingly, as shown in FIG. 3, wrinkles 345 may extend in a width direction from one edge to an opposite edge of the wrinkled polymer thin film 306. Furthermore, the transverse tension and accompanying compression along the machine direction may, relative to the initial bulk refractive index (n0), decrease the refractive index of the polymer thin film 305 along the transverse direction and increase the refractive index of the polymer thin film 305 along the machine direction such that $n2<n0<n1$, where n1 is the refractive index of the wrinkled polymer thin film 306 along the machine direction and n2 is the refractive index of the wrinkled polymer thin film 306 along the transverse direction orthogonal to the machine direction.

In some embodiments, conveyors 322 may be driven at a speed such that an aspect ratio ($\alpha$) of the wrinkles 345 may be substantially constant over a surface of the wrinkled polymer thin film 306. As used herein, the aspect ratio ($\alpha$) of wrinkles may, in some examples, refer to a ratio of a distance between wrinkle maxima (L) (i.e., the wrinkle periodicity) to the height (H) of the wrinkles, $\alpha=L/H$, where the height (H) is one half of the wrinkle amplitude (A). Example wrinkled polymer thin films may have a wrinkle pitch (L) of approximately 1000 micrometers to approximately 30000 micrometers and a wrinkle height (H) of approximately 10 micrometers to approximately 3000 micrometers. In some embodiments, a wrinkled polymer thin film 306 may have an aspect ratio ($\alpha$) of wrinkles of at least approximately 3, e.g., 3, 4, 5, 10, 20, 50, or 100, including ranges between any of the foregoing values.

After stretching, the wrinkled polymer thin film 306 may be disconnected from the conveyors 322. In some embodiments, the conveyors may release the wrinkled polymer thin film 306. In some embodiments, the wrinkled polymer thin film 306 may be cut to form a cut edge 340. The wrinkled polymer thin film 306 may be cooled and may exit system 300 at exit 330 as a wrinkled optically anisotropic polymer thin film 307.

Figure 4:
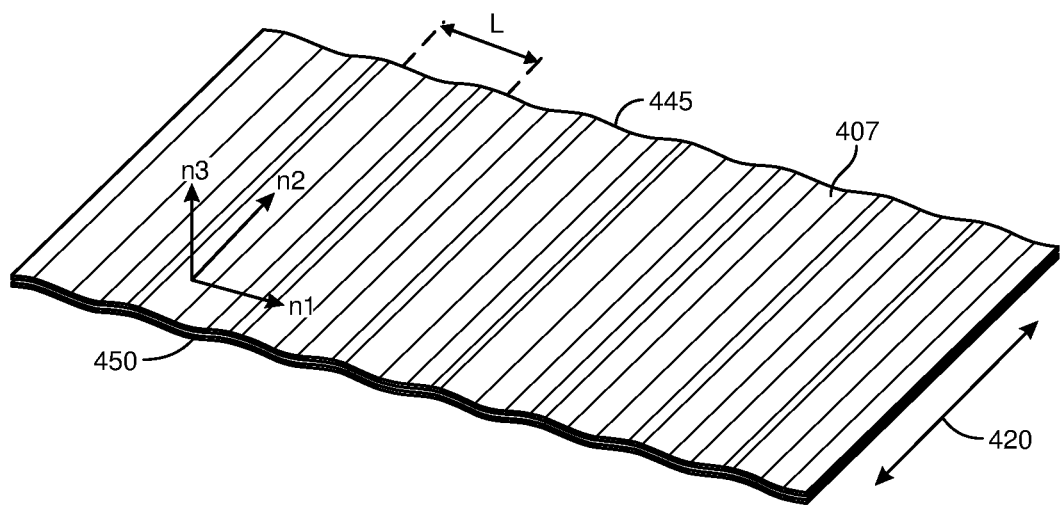
FIG. 4 is a perspective view of a wrinkled polymer thin film after exiting a thin film orientation system according to some embodiments.

According to some embodiments, a liner may be applied to one or both major surfaces of an optically anisotropic polymer thin film, such as wrinkled optically anisotropic polymer thin film 207 or wrinkled optically anisotropic polymer thin film 307. For instance, as shown in FIG. 4, a liner 450 may be laminated to bottom surface of optically anisotropic polymer thin film 407. Optically anisotropic polymer thin film 407 may include a plurality of substantially parallel wrinkles 445 having an axis of symmetry that is aligned with orientation axis 420. Accordingly, as shown in FIG. 4, wrinkles 445 may extend in a width direction from one edge to an opposite edge of the anisotropic polymer thin film 407.

Liner 450 may include a plastic layer or other substrate, which may provide a contactable surface enabling the stacking or rolling of polymer thin film 407. Suitable plastic liner materials include polyolefins, including polyethylene, and coated polymer films such as silicone-coated polymer films, e.g., polydimethylsiloxane (silicone rubber)-coated polyethylene terephthalate (PET).

Figure 5:
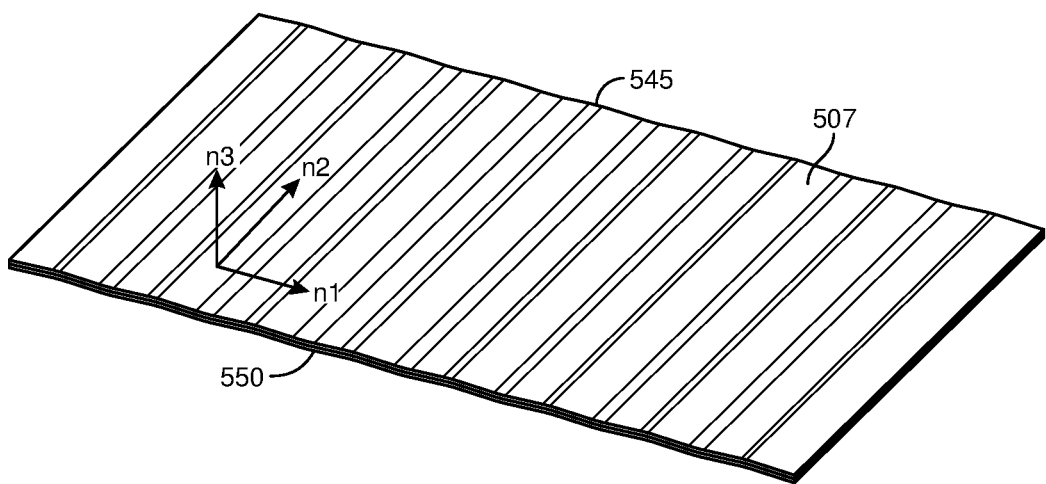
FIG. 5 is a perspective view of the polymer thin film of FIG. 4 after being held in tension at a constant temperature according to certain embodiments.

In some embodiments, following creation of a wrinkled optically anisotropic polymer thin film, the wrinkling effect may be decreased or eliminated by annealing the polymer thin film while placing the wrinkled optically anisotropic polymer thin film in tension. For instance, wrinkled polymer thin film 407 may be held in tension at a temperature of less than approximately 100° C. (e.g. 30° C., 40° C., 50° C., 60° C., 70° C., 80° C., 90° C., or 100° C., including ranges between any of the foregoing values) to flatten the wrinkles 445 and, in certain embodiments, develop the crystallinity of the polymer thin film. During annealing, tension may be applied in the machine direction (e.g., in a direction orthogonal to orientation axis 420) while the polymer thin film may be prevented from contracting in the transverse direction. Referring to FIG. 5, shown is a post-tension optically anisotropic polymer thin film 507 having reduced wrinkles 545 extend in a width direction from one edge to an opposite edge of the anisotropic polymer thin film 507. As in the embodiment of FIG. 4, a non-stick liner 550 may be formed over one or both major surfaces of polymer thin film 507 to facilitate stacking or rolling thereof.

According to some embodiments, an optically anisotropic polymer thin film may be affixed to an optical element such as a lens or other substrate. By way of example, an optically anisotropic polymer thin film (e.g., optically anisotropic polymer thin film 207, 307, 407 or 507) may be conformally laminated to the convex, concave, or planar surface of a lens using a suitable adhesive.

Lamination, in some embodiments, may include applying an adhesive to a bonding surface of at least one of (i) an optically anisotropic polymer thin film and (ii) a lens or other substrate, prior to bringing the respective bonding surfaces of the components together and then optionally curing the adhesive. For instance, an optically anisotropic polymer thin film may be stretched over and bonded to a lens surface. The act of stretching may, in some embodiments, decrease or eliminate wrinkles in the polymer thin film. Suitable adhesives include radiation curable adhesives, thermally curable adhesives, "B-staged" adhesives having a combination of radiation and thermally curable components, and pressure sensitive adhesives. A curable adhesive may be cured via the application of radiation, heat, and/or pressure to one or more of the components.

Figure 6:
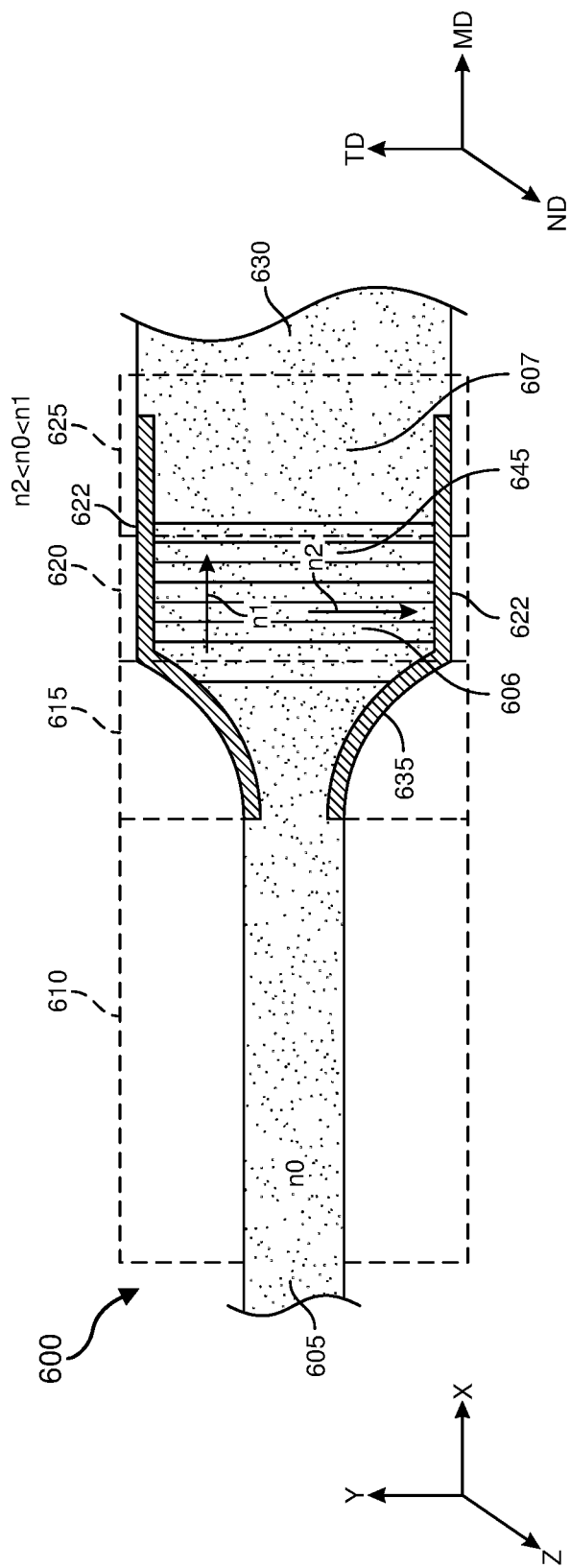
FIG. 6 is a schematic view of a polymer thin film transported by conveyors through a thin film orientation system according to further embodiments.

A still further example thin film orientation system for manufacturing an optically anisotropic polymer thin film is shown in FIG. 6. According to some embodiments, a polymer thin film 605 having an initial bulk refractive index (n0) may be guided along a machine direction (MD) of system 600 and pre-heated in pre-heating zone 610. A pre-heating temperature may range from approximately 80° C. to approximately 200° C., for example.

After passing through pre-heating zone 610, the heated polymer thin film 605 may be stretched within deformation zone 615. The temperature of the polymer thin film 605 may be maintained at a desired temperature before and/or during the act of stretching, i.e., within deformation zone 615, in order to improve the deformability of the polymer thin film relative to an un-heated polymer thin film. The temperature of the polymer thin film 605 within deformation zone 615 may be less than, equal to, or greater than the temperature of the polymer thin film within pre-heating zone 610.

The stretching operation may be performed by guiding the edges of the heated polymer thin film 605 along guide path 635 such as by clamping the edges of the polymer thin film to conveyors 622 that traverse the guide path 635. Guide path 635 may be configured such that during at least a portion of the stretching operation the heated polymer thin film 605 is under a state of uniaxial tension along one dimension and in compression along an orthogonal dimension. For instance, the polymer thin film 605 may be in compression in the machine direction, e.g., along the full guide path 635 or along one or more portions of the guide path 635 within deformation zone 615. Moreover, the guide path 635 and conveyers 622 may be configured such that, after stretching, the wrinkled polymer thin film 606 may be at least partially constrained in both the machine direction and the transverse direction. In certain embodiments, the velocity of the conveyors 622 in the machine direction may be approximately equal to the velocity of the wrinkled polymer thin film 606 exiting the guide path 635.

Compression of the polymer thin film 605 along the machine direction within the deformation region 615 may cause the formation of wrinkles 645 in the polymer thin film 605. In example embodiments, wrinkles 645 may be substantially parallel along the transverse direction of wrinkled polymer thin film 606. Furthermore, the transverse tension and accompanying compression along the machine direction may, relative to the initial bulk refractive index ($n0$), decrease the refractive index of the polymer thin film 605 along the transverse direction and increase the refractive index of the polymer thin film 605 along the machine direction such that $n2<n0<n1$, where $n1$ is the refractive index of the wrinkled polymer thin film 606 along the machine direction and $n2$ is the refractive index of the wrinkled polymer thin film 606 along the transverse direction.

In certain embodiments, the dimensional stability of wrinkled polymer thin film 606 may be improved by thermally treating the wrinkled polymer thin film 606 within heat setting region 620. A heat setting process may include heating the wrinkled polymer thin film 606 a dry atmosphere or in a mixture of water vapor and air, for example, at a temperature between approximately 110° C. and 200° C., although lesser and greater heat setting temperatures may be used. Following heat setting, the wrinkled polymer thin film 606 may be cooled within exit region 625.

According to some embodiments, wrinkled optically anisotropic polymer thin film 606 may be re-heated and optionally tensioned within exit region 625 to increase the optical anisotropy of the polymer film and/or decrease the height of, or even eliminate, wrinkles 645. The polymer thin film may be cooled and may exit system 600 at exit 630 as an un-wrinkled and optically anisotropic polymer thin film 607.

Figure 7:
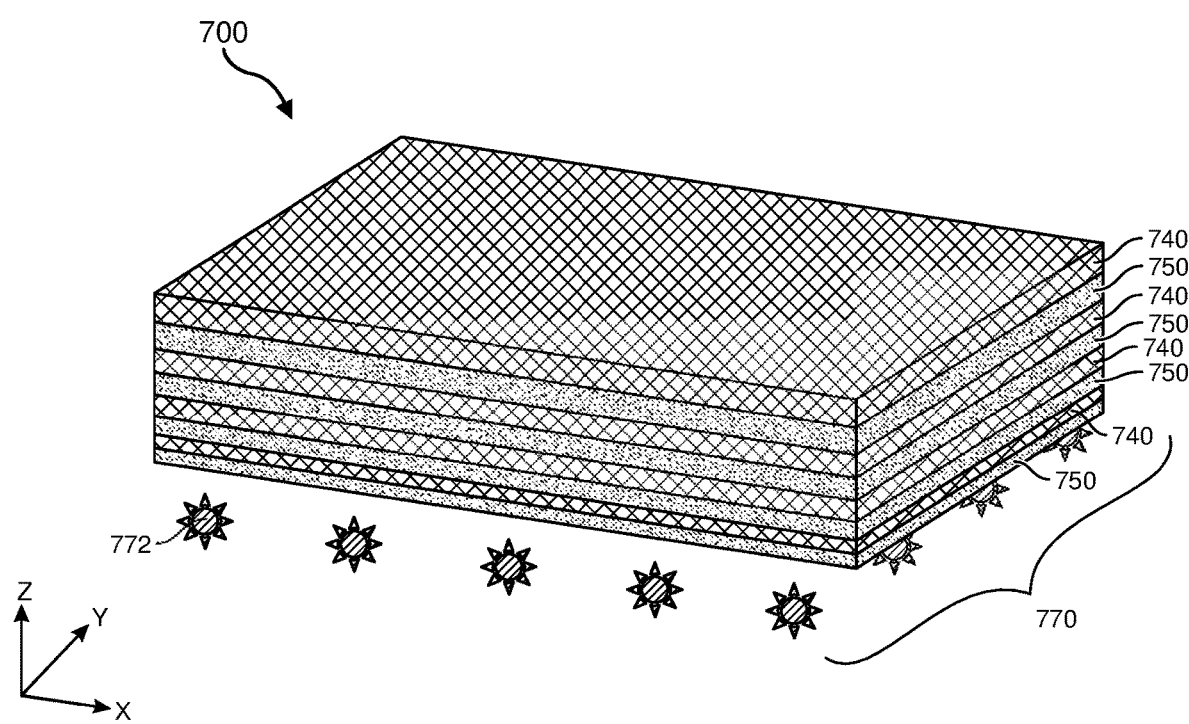
FIG. 7 shows a stack of alternating optically anisotropic polymer layers forming a reflective polarizer according to some embodiments.

FIG. 7 is a perspective view of a multilayer reflective polarizer according to various embodiments. The reflective polarizer 700 may include a stack of alternating primary and secondary polymer thin films 740, 750. In the illustrated embodiment, each layer 740 may include an optically anisotropic polymer thin film and each layer 750 may include an optically isotropic polymer thin film. Optically anisotropic polymer layers 740 and optically isotropic polymer layers 750 may have different refractive indices along a first in-plane direction (e.g., x-direction), and refractive indices along a second in-plane direction (e.g., y-direction) orthogonal to the first in-plane direction that are substantially matched. Primary and secondary polymer thin films 740, 750 may include wrinkled optically anisotropic polymer thin films.

According to some embodiments, from top to bottom the total thickness of each successive bilayer pair 740, 750, i.e., the thickness of each successive layer 740 and the thickness of each successive layer 750, may decrease throughout the stack, which may increase the wavelength range of the reflectance spectrum. In some embodiments, reflective polarizer 700 may be disposed proximate to an array 770 of light emitting diodes 772. Shown in Table 1 are configurations and optical properties for example broadband wavelength reflective polarizers.

TABLE 1

Configurations and Optical Properties of Example Reflective Polarizers

| $\Delta n = 0.3$ | | | $\Delta n = 0.5$ | | |
|---|---|---|---|---|---|
| Property | Symbol | Value | Property | Symbol | Value |
| High refractive index | nh | 1.76 | High refractive index | nh | 1.96 |
| Low refractive index | nl | 1.46 | Low refractive index | nl | 1.46 |
| Thickness of nh layer | th | 78.1 nm | Thickness of nh layer | th | 70.2 nm |
| Thickness of nl layer | tl | 94.2 nm | Thickness of nl layer | tl | 94.2 nm |
| Thickness gradient | grad | 40% | Thickness gradient | grad | 40% |

Figure 8:
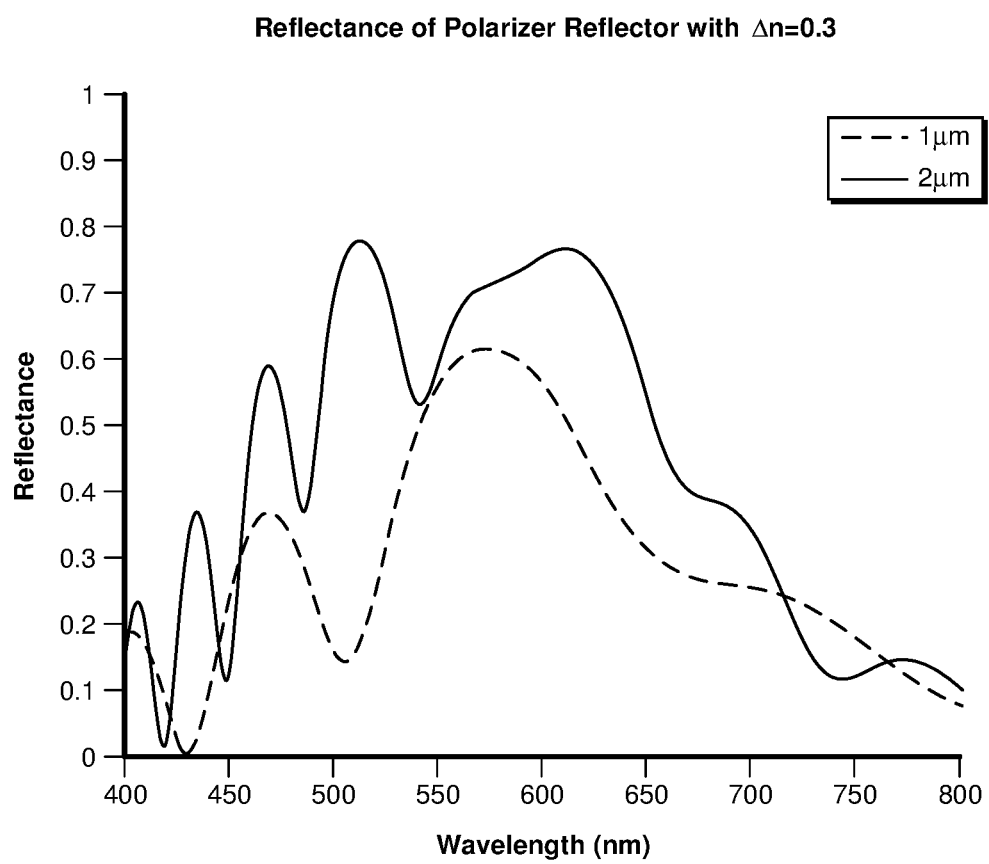
FIG. 8 is a plot of reflectance versus wavelength for 1 and 2 micrometer thick multilayer polymer stacks having a $\Delta n=0.3$ design according to various embodiments.
Figure 9:
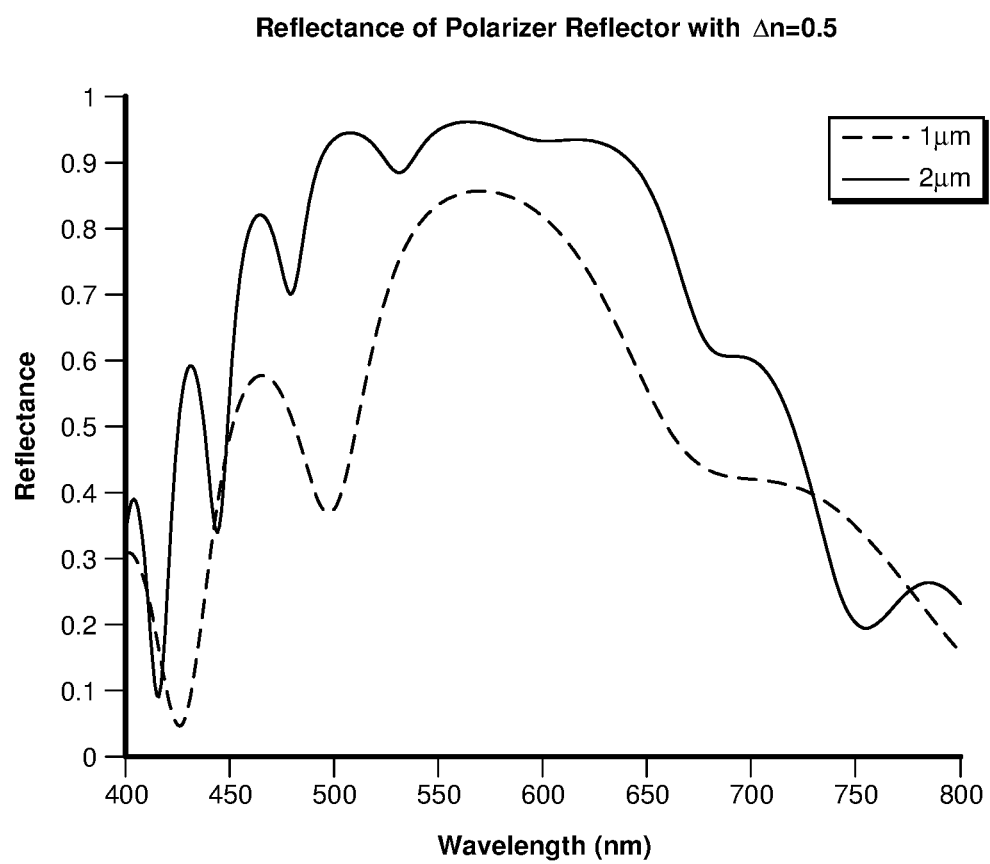
FIG. 9 is a plot of reflectance versus wavelength for 1 and 2 micrometer thick multilayer polymer stacks having a $\Delta n=0.5$ design according to various embodiments.
Figure 10:
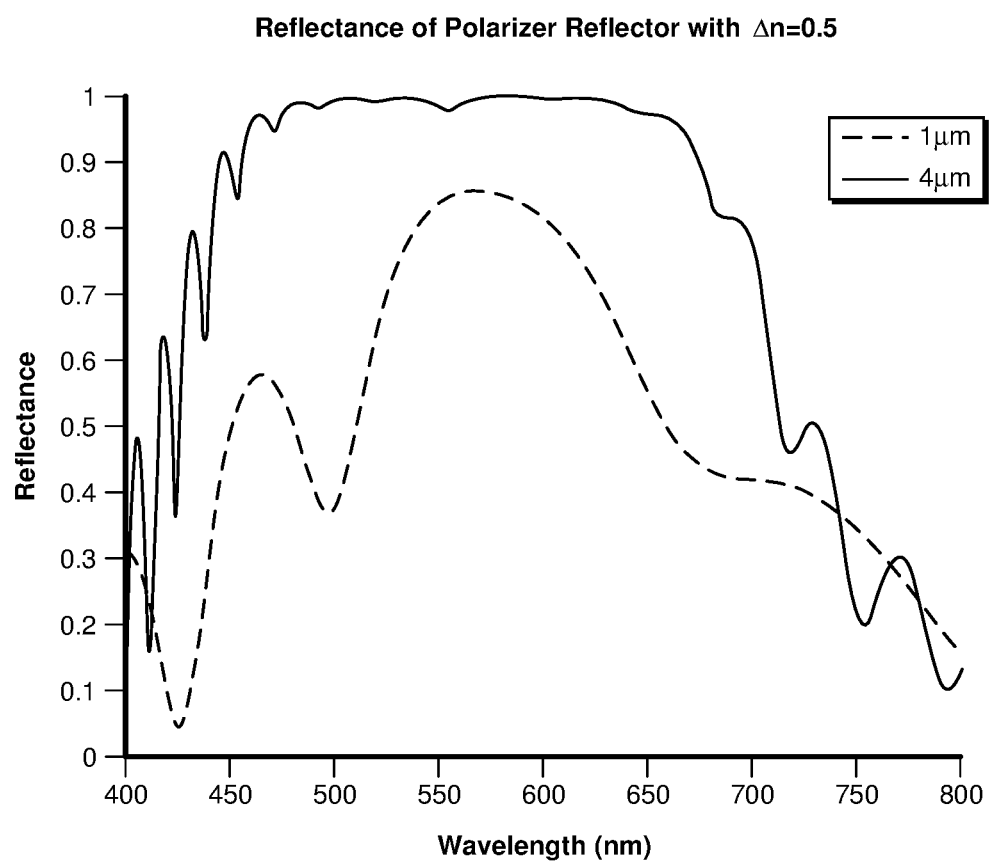
FIG. 10 is a plot of reflectance versus wavelength for 1 and 4 micrometer thick multilayer polymer stacks having a $\Delta n=0.5$ design according to various embodiments.

A plot of reflectance versus wavelength comparing 1 micrometer and 2 micrometer thick multilayer polarizers having an interlayer refractive index differential of 0.3 is shown in FIG. 8. Plots of reflectance versus wavelength comparing 1 and 2 micrometer thick multilayer polarizers having an interlayer refractive index differential of 0.5, and 1 and 4 micrometer thick multilayer polarizers having an interlayer refractive index differential of 0.5, respectively, are shown in FIGS. 9 and 10.

As disclosed herein, an optically anisotropic polymer thin film may be characterized by disparate refractive indices along each of its three major axes (i.e., length, width, and thickness). Such anisotropy may include in-plane refractive indices that differ by at least 0.05, and a through-thickness refractive index that is greater than at least one in-plane refractive index. During manufacture, a polymer material may be heated and stretched along one direction and appropriately constrained to induce compression in an orthogonal direction, causing wrinkling and buckling of the polymer thin film and an attendant directionally-dependent refractive index. For instance, the polymer material may be heated and moved through an apparatus along a machine direction while being stretched in a transverse direction to induce transverse tension and compression along the machine direction. The buckled polymer thin film may be laminated to a polymer liner, such as a polyolefin liner or a liner including polydimethylsiloxane coated onto a polyethylene terephthalate (PET) layer. Tension may be applied to the wrinkled polymer thin film to optionally decrease the extent of wrinkling. Optically anisotropic polymer thin films may be used individually or stacked to form a composite that may be laminated to an optical element such as a lens. The optically anisotropic thin films may be incorporated into birefringent gratings and multilayer reflective polarizers, for example, which may be used in a variety of display-related applications such as transmissive or reflective pancake optical systems and to enhance brightness in display systems (e.g., LED and OLED displays) that use polarized light.

EXAMPLE EMBODIMENTS

Example 1: A polymer layer includes a first in-plane refractive index extending along a first direction of the polymer layer, a second in-plane refractive index less than the first in-plane refractive index extending along a second direction of the polymer layer orthogonal to the first direction, a third refractive index along a direction orthogonal to both the first direction and the second direction, and a plurality of wrinkles extending along a surface of the polymer layer, where a difference between the first in-plane refractive index and the second in-plane refractive index is at least approximately 0.05 and the third refractive index is greater than the second in-plane refractive index.

Example 2: The polymer layer of Example 1, where the third refractive index is less than the first in-plane refractive index.

Example 3: The polymer layer of any of Examples 1 and 2, having a length of at least approximately 5 cm and a width of at least approximately 5 cm.

Example 4: The polymer layer of any of Examples 1-3, where the wrinkles have an average height of at least approximately 10 micrometers.

Example 5: The polymer layer of any of Examples 1-4, where the wrinkles have an aspect ratio (α) of at least approximately 3.

Example 6: The polymer layer of any of Examples 1-5, where at least a portion of wrinkles extend along the second direction.

Example 7: A reflective polarizer including the polymer layer of any of Examples 1-6.

Example 8: The reflective polarizer of Example 7, further including a secondary polymer layer directly overlying the polymer layer, the second polymer layer having a first in-plane refractive index substantially different than the first in-plane refractive index of the polymer layer and a second in-plane refractive index substantially equal to the second in-plane refractive index of the polymer layer.

Example 9: A reflective polarizer includes a stack of alternating primary and secondary polymer layers, wherein each primary polymer layer may be characterized by (a) a first in-plane refractive index, (b) a second in-plane refractive index orthogonal to and less than the first in-plane refractive index, and (c) a third refractive index along a direction orthogonal to a major surface of the primary polymer layer, where a difference between the first in-plane refractive index and the second in-plane refractive index is at least approximately 0.05 and the third refractive index is greater than the second refractive index, and each secondary polymer layer may be characterized by (a) a first in-plane refractive index substantially different than the first in-plane refractive index of each primary polymer layer, and (b) a second in-plane refractive index substantially equal to the second in-plane refractive index of each primary polymer layer.

Example 10: The reflective polarizer of Example 9, where each first polymer layer and each second polymer layer has a thickness ranging from approximately 10 nm to approximately 200 nm.

Example 11: The reflective polarizer of any of Examples 9 and 10, where a first pair of the alternating first and second polymer layers is thinner than an adjacent second pair of the alternating first and second polymer layers.

Example 12: The reflective polarizer of any of Examples 9-11, where each successive pair of the alternating first and second polymer layers is thinner than an overlying pair of the alternating first and second polymer layers is thinner.

Example 13: The reflective polarizer of any of Examples 9-12, where the first and second polymer layers are buckled along a common axis.

Example 14: The reflective polarizer of any of Examples 9-13, where the stack of alternating first and second polymer layers has a thickness of less than approximately 5 micrometers.

Example 15: The reflective polarizer of any of Examples 9-14, further including an array of light-emitting diodes located proximate to a surface of the stack of first and second polymer layers.

Example 16: The reflective polarizer of Example 15, where a distance between the array of light-emitting diodes and the surface of the stack of primary and secondary polymer layers is less than approximately 5 micrometers.

Example 17: A method includes conveying a polymer thin film along a machine direction while applying an in-plane tensile stress to the polymer thin film in a direction transverse and orthogonal to the machine direction, and stretching the polymer thin film in the transverse direction while allowing contraction of the polymer thin film in the machine direction and the formation of wrinkles in the polymer thin film.

Example 18: The method of Example 17, where the wrinkles have an average height ranging from approximately 10 micrometers to approximately 1000 micrometers.

Example 19: The method of any of Examples 17 and 18, where after the stretching a refractive index in the machine direction is greater than a refractive index in the transverse direction.

Example 20: The method of any of Examples 17-19, further including forming a plastic liner over a major surface of the polymer layer after the stretching.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (e.g., augmented-reality system 1100 in FIG. 11) or that visually immerses a user in an artificial reality (e.g., virtual-reality system 1200 in FIG. 12). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 11:
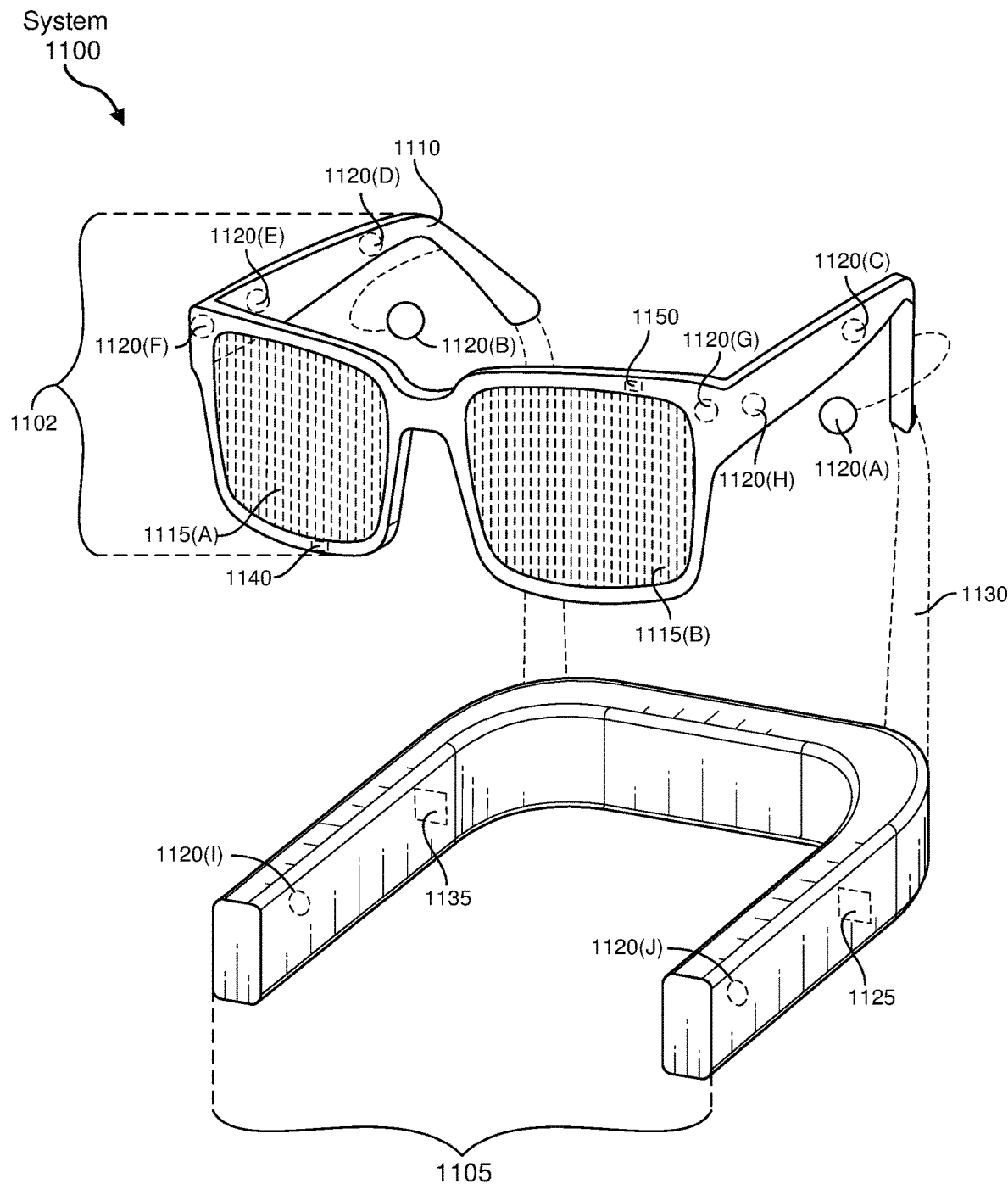
FIG. 11 is an illustration of exemplary augmented-reality glasses that may be used in connection with embodiments of this disclosure.
Figure 12:
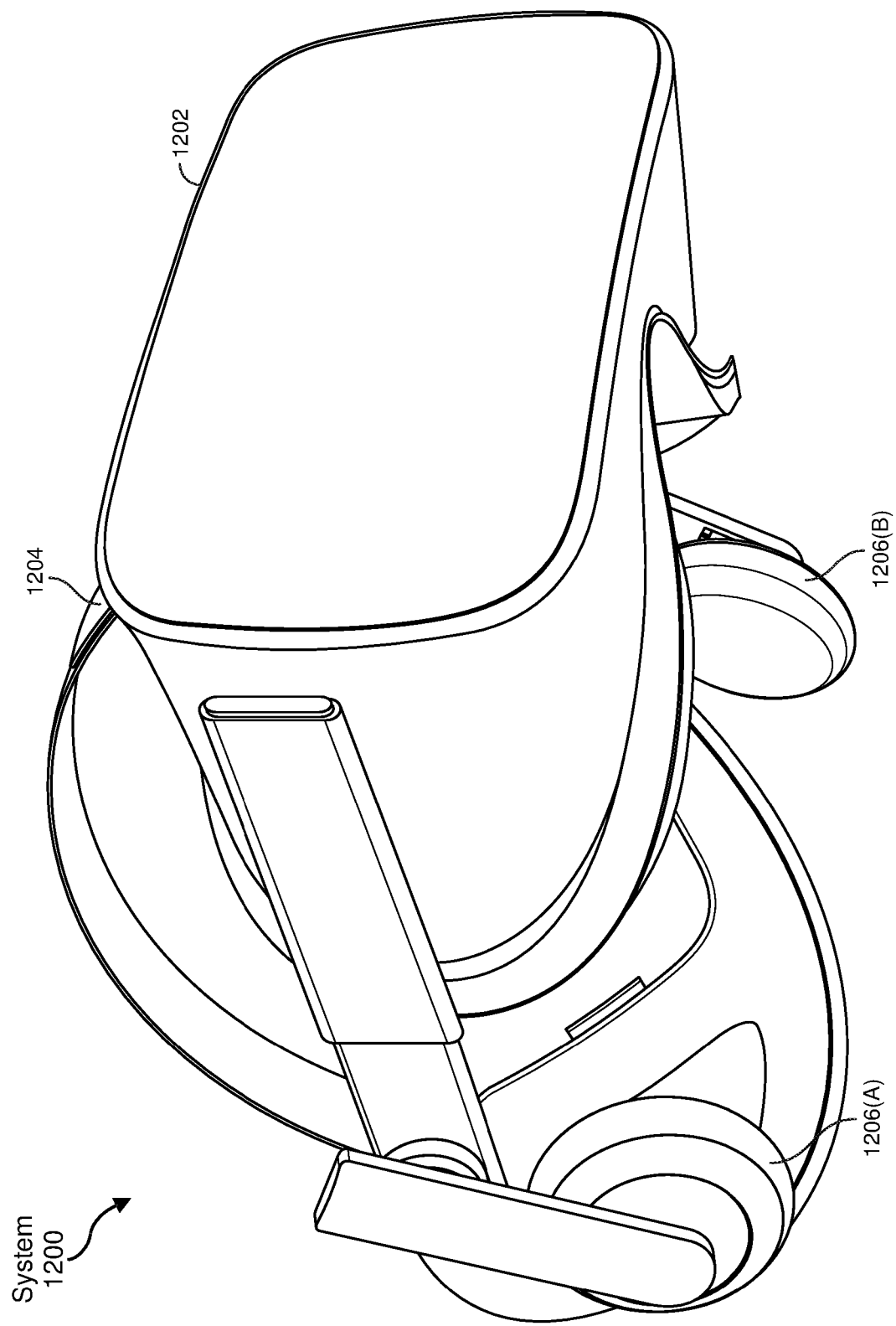
FIG. 12 is an illustration of an exemplary virtual-reality headset that may be used in connection with embodiments of this disclosure.

Turning to FIG. 11, augmented-reality system 1100 may include an eyewear device 1102 with a frame 1110 configured to hold a left display device 1115(A) and a right display device 1115(B) in front of a user's eyes. Display devices 1115(A) and 1115(B) may act together or independently to present an image or series of images to a user. While augmented-reality system 1100 includes two displays, embodiments of this disclosure may be implemented in augmented-reality systems with a single NED or more than two NEDs.

In some embodiments, augmented-reality system 1100 may include one or more sensors, such as sensor 1140. Sensor 1140 may generate measurement signals in response to motion of augmented-reality system 1100 and may be located on substantially any portion of frame 1110. Sensor 1140 may represent a position sensor, an inertial measurement unit (IMU), a depth camera assembly, a structured light emitter and/or detector, or any combination thereof. In some embodiments, augmented-reality system 1100 may or may not include sensor 1140 or may include more than one sensor. In embodiments in which sensor 1140 includes an IMU, the IMU may generate calibration data based on measurement signals from sensor 1140. Examples of sensor 1140 may include, without limitation, accelerometers, gyroscopes, magnetometers, other suitable types of sensors that detect motion, sensors used for error correction of the IMU, or some combination thereof.

Augmented-reality system 1100 may also include a microphone array with a plurality of acoustic transducers 1120(A)-1120(J), referred to collectively as acoustic transducers 1120. Acoustic transducers 1120 may be transducers that detect air pressure variations induced by sound waves. Each acoustic transducer 1120 may be configured to detect sound and convert the detected sound into an electronic format (e.g., an analog or digital format). The microphone array in FIG. 11 may include, for example, ten acoustic transducers: 1120(A) and 1120(B), which may be designed to be placed inside a corresponding ear of the user, acoustic transducers 1120(C), 1120(D), 1120(E), 1120(F), 1120(G), and 1120(H), which may be positioned at various locations on frame 1110, and/or acoustic transducers 1120(I) and 1120(J), which may be positioned on a corresponding neckband 1105.

In some embodiments, one or more of acoustic transducers 1120(A)-(F) may be used as output transducers (e.g., speakers). For example, acoustic transducers 1120(A) and/or 1120(B) may be earbuds or any other suitable type of headphone or speaker.

The configuration of acoustic transducers 1120 of the microphone array may vary. While augmented-reality system 1100 is shown in FIG. 11 as having ten acoustic transducers 1120, the number of acoustic transducers 1120 may be greater or less than ten. In some embodiments, using higher numbers of acoustic transducers 1120 may increase the amount of audio information collected and/or the sensitivity and accuracy of the audio information. In contrast, using a lower number of acoustic transducers 1120 may decrease the computing power required by an associated controller 1150 to process the collected audio information. In addition, the position of each acoustic transducer 1120 of the microphone array may vary. For example, the position of an acoustic transducer 1120 may include a defined position on the user, a defined coordinate on frame 1110, an orientation associated with each acoustic transducer 1120, or some combination thereof.

Acoustic transducers 1120(A) and 1120(B) may be positioned on different parts of the user's ear, such as behind the pinna, behind the tragus, and/or within the auricle or fossa. Or, there may be additional acoustic transducers 1120 on or surrounding the ear in addition to acoustic transducers 1120 inside the ear canal. Having an acoustic transducer 1120 positioned next to an ear canal of a user may enable the microphone array to collect information on how sounds arrive at the ear canal. By positioning at least two of acoustic transducers 1120 on either side of a user's head (e.g., as binaural microphones), augmented-reality device 1100 may simulate binaural hearing and capture a 3D stereo sound field around about a user's head. In some embodiments, acoustic transducers 1120(A) and 1120(B) may be connected to augmented-reality system 1100 via a wired connection 1130, and in other embodiments acoustic transducers 1120(A) and 1120(B) may be connected to augmented-reality system 1100 via a wireless connection (e.g., a Bluetooth connection). In still other embodiments, acoustic transducers 1120(A) and 1120(B) may not be used at all in conjunction with augmented-reality system 1100.

Acoustic transducers 1120 on frame 1110 may be positioned along the length of the temples, across the bridge, above or below display devices 1115(A) and 1115(B), or some combination thereof. Acoustic transducers 1120 may be oriented such that the microphone array is able to detect sounds in a wide range of directions surrounding the user wearing the augmented-reality system 1100. In some embodiments, an optimization process may be performed during manufacturing of augmented-reality system 1100 to determine relative positioning of each acoustic transducer 1120 in the microphone array.

In some examples, augmented-reality system 1100 may include or be connected to an external device (e.g., a paired device), such as neckband 1105. Neckband 1105 generally represents any type or form of paired device. Thus, the following discussion of neckband 1105 may also apply to various other paired devices, such as charging cases, smart watches, smart phones, wrist bands, other wearable devices, hand-held controllers, tablet computers, laptop computers, other external compute devices, etc.

As shown, neckband 1105 may be coupled to eyewear device 1102 via one or more connectors. The connectors may be wired or wireless and may include electrical and/or non-electrical (e.g., structural) components. In some cases, eyewear device 1102 and neckband 1105 may operate independently without any wired or wireless connection between them. While FIG. 11 illustrates the components of eyewear device 1102 and neckband 1105 in example locations on eyewear device 1102 and neckband 1105, the components may be located elsewhere and/or distributed differently on eyewear device 1102 and/or neckband 1105. In some embodiments, the components of eyewear device 1102 and neckband 1105 may be located on one or more additional peripheral devices paired with eyewear device 1102, neckband 1105, or some combination thereof.

Pairing external devices, such as neckband 1105, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1100 may be provided by a paired device or shared between a paired device and an eyewear device, thus reducing the weight, heat profile, and form factor of the eyewear device overall while still retaining desired functionality. For example, neckband 1105 may allow components that would otherwise be included on an eyewear device to be included in neckband 1105 since users may tolerate a heavier weight load on their shoulders than they would tolerate on their heads. Neckband 1105 may also have a larger surface area over which to diffuse and disperse heat to the ambient environment. Thus, neckband 1105 may allow for greater battery and computation capacity than might otherwise have been possible on a stand-alone eyewear device. Since weight carried in neckband 1105 may be less invasive to a user than weight carried in eyewear device 1102, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1105 may be communicatively coupled with eyewear device 1102 and/or to other devices. These other devices may provide certain functions (e.g., tracking, localizing, depth mapping, processing, storage, etc.) to augmented-reality system 1100. In the embodiment of FIG. 11, neckband 1105 may include two acoustic transducers (e.g., 1120(I) and 1120(J)) that are part of the microphone array (or potentially form their own microphone subarray). Neckband 1105 may also include a controller 1125 and a power source 1135.

Acoustic transducers 1120(I) and 1120(J) of neckband 1105 may be configured to detect sound and convert the detected sound into an electronic format (analog or digital). In the embodiment of FIG. 11, acoustic transducers 1120(I) and 1120(J) may be positioned on neckband 1105, thereby increasing the distance between the neckband acoustic transducers 1120(I) and 1120(J) and other acoustic transducers 1120 positioned on eyewear device 1102. In some cases, increasing the distance between acoustic transducers 1120 of the microphone array may improve the accuracy of beamforming performed via the microphone array. For example, if a sound is detected by acoustic transducers 1120(C) and 1120(D) and the distance between acoustic transducers 1120(C) and 1120(D) is greater than, e.g., the distance between acoustic transducers 1120(D) and 1120(E), the determined source location of the detected sound may be more accurate than if the sound had been detected by acoustic transducers 1120(D) and 1120(E).

Controller 1125 of neckband 1105 may process information generated by the sensors on neckband 1105 and/or augmented-reality system 1100. For example, controller 1125 may process information from the microphone array that describes sounds detected by the microphone array. For each detected sound, controller 1125 may perform a direction-of-arrival (DOA) estimation to estimate a direction from which the detected sound arrived at the microphone array. As the microphone array detects sounds, controller 1125 may populate an audio data set with the information. In embodiments in which augmented-reality system 1100 includes an inertial measurement unit, controller 1125 may compute all inertial and spatial calculations from the IMU located on eyewear device 1102. A connector may convey information between augmented-reality system 1100 and neckband 1105 and between augmented-reality system 1100 and controller 1125. The information may be in the form of optical data, electrical data, wireless data, or any other transmittable data form. Moving the processing of information generated by augmented-reality system 1100 to neckband 1105 may reduce weight and heat in eyewear device 1102, making it more comfortable to the user.

Power source 1135 in neckband 1105 may provide power to eyewear device 1102 and/or to neckband 1105. Power source 1135 may include, without limitation, lithium ion batteries, lithium-polymer batteries, primary lithium batteries, alkaline batteries, or any other form of power storage. In some cases, power source 1135 may be a wired power source. Including power source 1135 on neckband 1105 instead of on eyewear device 1102 may help better distribute the weight and heat generated by power source 1135.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1200 in FIG. 12, that mostly or completely covers a user's field of view. Virtual-reality system 1200 may include a front rigid body 1202 and a band 1204 shaped to fit around a user's head. Virtual-reality system 1200 may also include output audio transducers 1206(A) and 1206(B). Furthermore, while not shown in FIG. 12, front rigid body 1202 may include one or more electronic elements, including one or more electronic displays, one or more inertial measurement units (IMUs), one or more tracking emitters or detectors, and/or any other suitable device or system for creating an artificial reality experience.

Artificial-reality systems may include a variety of types of visual feedback mechanisms. For example, display devices in augmented-reality system 1100 and/or virtual-reality system 1200 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some artificial-reality systems may include one or more projection systems. For example, display devices in augmented-reality system 1100 and/or virtual-reality system 1200 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

Artificial-reality systems may also include various types of computer vision components and subsystems. For example, augmented-reality system 1100 and/or virtual-reality system 1200 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIG. 12, output audio transducers 1206(A) and 1206(B) may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

While not shown in FIG. 11, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

It will be understood that when an element such as a layer or a region is referred to as being formed on, deposited on, or disposed "on" or "over" another element, it may be located directly on at least a portion of the other element, or one or more intervening elements may also be present. In contrast, when an element is referred to as being "directly on" or "directly over" another element, it may be located on at least a portion of the other element, with no intervening elements present.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a polymer thin film that comprises or includes polyethylene naphthalate include embodiments where a polymer thin film consists essentially of polyethylene naphthalate and embodiments where a polymer thin film consists of polyethylene naphthalate.

What is claimed is:

1. A polymer layer comprising:
  a first in-plane refractive index extending along a first direction of the polymer layer;
  a second in-plane refractive index less than the first in-plane refractive index extending along a second direction of the polymer layer orthogonal to the first direction;
  a third refractive index along a direction orthogonal to both the first direction and the second direction; and
  a plurality of wrinkles extending along a surface of the polymer layer, wherein:
    a difference between the first in-plane refractive index and the second in-plane refractive index is at least approximately 0.05, and the third refractive index is greater than the second in-plane refractive index, and each of the plurality of wrinkles extends in a width direction from one edge to an opposite edge of the polymer layer.

2. The polymer layer of claim 1, wherein the third refractive index is less than the first in-plane refractive index.

3. The polymer layer of claim 1, having a length of at least approximately 5 cm and a width of at least approximately 5 cm.

4. The polymer layer of claim 1, wherein the wrinkles have an average height of at least approximately 10 micrometers.

5. The polymer layer of claim 1, wherein the wrinkles have an aspect ratio ($\alpha$) of at least approximately 3.

6. The polymer layer of claim 1, wherein the second direction is parallel to the width direction.

7. A reflective polarizer comprising the polymer layer of claim 1.

8. The reflective polarizer of claim 7, further comprising a secondary polymer layer directly overlying the polymer layer, the second polymer layer having a first in-plane refractive index substantially different than the first in-plane refractive index of the polymer layer and a second in-plane refractive index substantially equal to the second in-plane refractive index of the polymer layer.

* * * * *